US008553157B2

(12) United States Patent
Waites et al.

(10) Patent No.: US 8,553,157 B2
(45) Date of Patent: Oct. 8, 2013

(54) TELEVISION WITH ENERGY SAVING AND QUICK START MODES

(75) Inventors: Nigel Waites, Lakeville, MN (US); Mahmood Majid, Lakeville, MN (US)

(73) Assignee: BBY Solutions, Inc., Richfield, MN (US)

( * ) Notice: Subject to any disclaimer, the term of this patent is extended or adjusted under 35 U.S.C. 154(b) by 21 days.

(21) Appl. No.: 13/192,967

(22) Filed: Jul. 28, 2011

(65) Prior Publication Data

US 2012/0320280 A1 Dec. 20, 2012

Related U.S. Application Data

(60) Provisional application No. 61/498,784, filed on Jun. 20, 2011.

(51) Int. Cl.
*H04N 5/63* (2006.01)

(52) U.S. Cl.
USPC .......................................................... 348/730

(58) Field of Classification Search
USPC ................. 348/730, 731–734, 725; 713/320, 713/323, 324, 340; 725/151, 153, 139, 141, 725/142, 131, 133, 134
IPC ................................................ H04N 5/63, 5/44
See application file for complete search history.

(56) References Cited

U.S. PATENT DOCUMENTS

| 7,411,631 B1 * | 8/2008 | Joshi et al. | 348/730 |
| 8,125,572 B2 * | 2/2012 | Koo | 348/730 |
| 2005/0270422 A1 * | 12/2005 | Hsieh | 348/730 |
| 2006/0294572 A1 | 12/2006 | Walter | |
| 2011/0037324 A1 | 2/2011 | Perper et al. | |
| 2011/0037905 A1 * | 2/2011 | Choi et al. | 348/730 |

OTHER PUBLICATIONS

Aug. 27, 2012 PCT Search Report and Written Opinion, PCT/US2012/42618.
Hewlett-Packard Corporation, Intel Corporation, Microsoft Corporation, Phoenix Technologies Ltd., Toshiba Corporation, Advanced Configuration and Power Interface Specification, Revision 4.0, Jun. 16, 2009.
Hewlett-Packard Corporation, Intel Corporation, Microsoft Corporation, Phoenix Technologies Ltd., Toshiba Corporation, Advanced Configuration and Power Interface Specification, Revision 4.0a, Apr. 5, 2010.
Jun. 27, 2013 PCT International Preliminary Report on Patentability (Serial No. PCT/US12/42618)—Our Matter 4876.

* cited by examiner

*Primary Examiner* — Sherrie Hsia
(74) *Attorney, Agent, or Firm* — Beck & Tysver PLLC

(57) ABSTRACT

The present invention is a television that executes a process for transitioning between multiple power modes. Both the transition events and the power states may be factory-defined, or they may be user-configurable. The TV may have two sleep modes. In a quick-start mode, the screen is powered down but the operating system is spun-up, and possibly other major functional subsystems are user-enabled. In an energy-saving mode, fewer subsystems than quick-start mode, and possibly only components required to recognize a tactile control requesting a return to a power-on mode, may be enabled. Quick-start is less efficient than energy-saving mode, but results in much faster return to power-in mode. In some embodiments, power modes and transition events between them power modes may be automated, and either user defined or factory defined.

18 Claims, 9 Drawing Sheets

TELEVISION WITH ENERGY SAVING AND QUICK START MODES

FIELD OF THE INVENTION

The present invention relates to television technology. More specifically, the present invention relates to an apparatus and method relating to energy saving features and quick start of a television.

BACKGROUND OF THE INVENTION

Modern computers often provide one or more power-saving modes. The "Advanced Configuration and Power Interface Specification", Revision 4.0 (Jun. 16, 2009) (the "ACPI", which is hereby incorporated by reference in its entirety), for example, applies "to all classes of computers including (but not limited to) desktop, mobile, workstation, and server machines." (ACPI §1). The ACPI illustrates a variety of possibilities for power-saving modes. It defines four global states for an entire system, namely Mechanical Off, Soft Off, Sleeping, and Working. (ACPI §2.2) Within the Sleeping global state, five variations of sleeping states are distinguished by whether, and to what extent, system context (e.g., CPU, chip set, system cache, memory, and platform) is maintained. (ACPI §§2.4 and 7.3.4).

A legacy computer system typically handles power-saving modes through its BIOS. The APCI describes power-management that is implemented primarily and almost exclusively by the operating system.

It is now recognized that electronic devices, especially when taken in aggregate, can consume significant energy even when in standby or sleep mode. Consequently, governments and organizations advocating energy conservation are seeking tighter control of such energy use through both incentives and regulation. Such measures might specify the maximum energy consumed per unit time (watts) that a device can use in a standby/sleep mode, or specify the total amount of energy the device can use while the device is in a standby/sleep mode. For example, the United States Environmental Protection Agency sets guidelines for a TV to qualify for an ENERGY STAR rating. Qualification requires that the TV consume less than one watt of electricity while the TV is in a "standby" mode that it allows it to respond to a remote control.

A television (TV) is a device that includes a built-in tuner to select a broadcast, cable, or satellite channel for viewing, and a monitor (or "screen"), the tuner and monitor contained within a single housing. A modern TV may be controlled by a remote control device, or "remote." Although aspects of TV operation may utilize an operating system (OS) and one or more processors contained within the housing, a TV does not provide users with direct access to the OS, either through a command line interface or through a windowing shell. A TV does not provide users with the capability to execute arbitrary software applications. Although a TV may have tangible controls in the housing and the remote—such as buttons to select channel, volume, brightness, and contrast, or to invoke a menu system, a TV does not have a full feature alphanumeric keyboard. In these respects, a TV is distinct from a computer.

SUMMARY OF THE INVENTION

A modern TV may be quite complex in terms of its functionality, and so may be managed by one or more processors within an OS (e.g., Linux). Spinning up the OS and, in turn, the major functional systems of the TV may be slow, and depending upon sophistication of the TV, may require tens of seconds to even a minute or more. Compliance with energy standards, such as ENERGY STAR, may require that most of these major functional subsystems be powered off, or disabled to the user and essentially powered off. Indeed, the OS itself may need to be shut down. Waiting so long for a TV to turn on may be frustrating to many consumers.

The screen of a TV consumes significant power. In the case of an LCD screen, a backlight that may be 60 watts or more is used to illuminate the display. Powering off the video system, therefore, saves significant energy, although it may not meet some particular relevant energy standard. Embodiment TVs of the invention may give the user some measure of control over the trade-off between energy efficiency and start-up speed, while possibly still satisfying a target energy efficiency standard.

In some embodiments, a TV has at least four factory-defined power modes including power-on, quick-start, energy-saving, and unplugged modes. In the power-on mode, the TV is fully functional as normal. While in the power-on mode, the TV may save user environment information about the current state of the system (e.g., current tuner channel) to tangible electronic storage, such as a flash drive or hard disk. In the unplugged mode, none of the subsystems are receiving external power, but some subsystems, such as a system clock, may be battery powered.

Quick-start mode and energy-saving mode each consume significantly less energy than power-on mode. In quick-start mode, power is turned off or significantly reduced to the video subsystem, but the operating system remains booted up. Entering quick-start mode may be by user interaction with the user interface, such as the press of a button on a remote control unit or a housing keypad. Restoration to power-on mode from quick-start mode may occur in less than 10 or even 5 seconds, for example, by simply turning on a bulb backlighting the screen. Return to power-on mode may be triggered by receipt by the system of a user interaction with the user interface, such as the press of a button on a remote control unit or a housing keypad.

In energy-saving mode, various subsystems are shut-down to achieve a relevant energy saving standard. In addition to the video subsystem, the operating system and most if not all the other major functional subsystems may be disabled to the user, substantially or entirely powered down. Entering energy-saving mode may be by user interaction with the user interface, such as the press of a button on a remote control unit or a housing keypad. Restoration to power-on mode will be slower than from quick-start mode, possibly taking 30 s or more. Return to power-on mode may be triggered by receipt by the system of a user interaction with the user interface, such as the press of a button on a remote control unit or a housing keypad.

The system may have a default sleep mode, either energy-saving or quick-start. Either may be set by the default at the factory, but preferably it will be energy-saving mode. The system may support a user change, possibly through a menu system in a graphical user interface, regarding which of two or more sleep modes will be the default, say a change from energy-saving to quick-start mode, and/or conversely. Upon getting plugged in from unplugged-mode, the TV may restore either the last-set default, or a factory default, or a specific choice, such as energy-saving mode or quick-start mode.

From the unplugged mode or any sleep mode, user environment data may be accessed from tangible storage to restore the system to any of the other modes. From a sleep mode, the system may restore the system as much as possible to power-on mode. From the unplugged mode, the system might be restored to a sleep mode.

Some embodiments include automated transitions from one mode to another upon occurrence of a triggering event. Mode configuration, triggers, and target modes may be either factory set, and/or user defined, in various combinations depending upon embodiment.

DETAILED DESCRIPTION OF EXEMPLARY EMBODIMENTS

This description provides embodiments of the invention intended as exemplary implementations. The reader of ordinary skill in the art will realize that the invention has broader scope than the particular examples described here.

Figure 1:
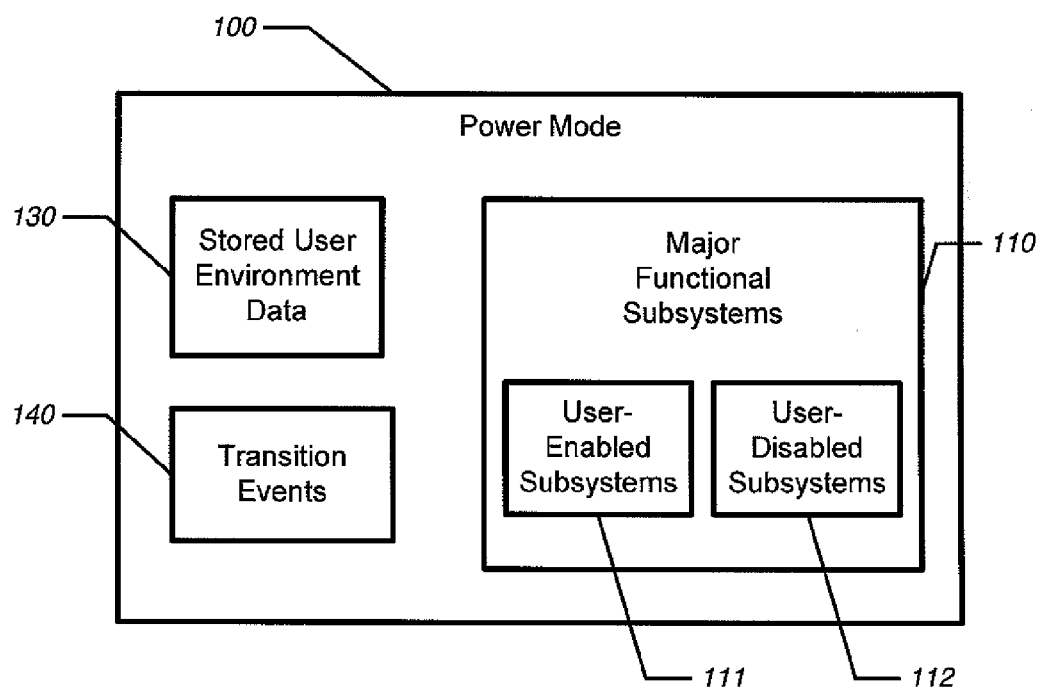
FIG. 1 is a schematic drawing illustrating elements of a typical power mode.

The invention is an apparatus and method for transitioning between multiple power modes 100 in a television (TV) 200, which may occur automatically, or manually by request through a user interface. As illustrated by FIG. 1, a power mode 100 is characterized by the state of major functional subsystems 110; the user environment 130 data available from storage; and the transition events 140 that are available from that mode 100 to other modes 100. A TV 200 may have hardware components at all levels of complexity. We are concerned here with the subsystems at the highest level of complexity, which we term major functional subsystems 110. A major functional subsystem 110 is a subsystem, or set of components at a level of integration or abstraction that an ordinary user of the TV 200 would perceive as either working or not. Examples of major functional subsystems 110 are described in connection with FIG. 4.

We define a major functional subsystem 110 to be user-enabled 111 within a power mode 100 if the subsystem is either executing or functioning within the mode 100, or the system will allow a user to cause the subsystem to execute or function while the system is in that mode 100. A major functional subsystem 110 is user-disabled 112 if the user cannot cause that subsystem to execute or function without a transition of the system to another mode 100. Clearly, a subsystem that is not receiving power is user-disabled 112. But some hardware components within a subsystem might be receiving some power, although the user does not have access to the functionality of the subsystem, so such a major functional subsystem 110 would be disabled from the user's perspective. For some subsystems, whether the subsystem is user-enabled 111 or user-disabled 112 may simply be a matter of whether that subsystem is powered on or off.

The user environment 130 data is characterized both by its content, and by where it is stored. The user environment 130 data includes state information about the major functional subsystems 110, which might be set by default, or established through use of the TV 200 when in PO-Mode 500. For example, current tuner channel might be included in the user environment data included in a sleep mode 590. Depending upon mode 100, elements of the user environment 130 could be stored on a slow storage medium, such as hard disk 220, or on a faster medium, such as flash memory 221, or it might be held in random access memory (RAM) 215 (e.g., software instructions 310 being executed by a processor 225) when, for example, the system is in PO-Mode 500, or some combination of storage types. A transition event 140 is an event that causes the system to transition from the current power mode 100 to another one. Such an event is associated with one or more triggers, and a target mode 100.

Figure 2:
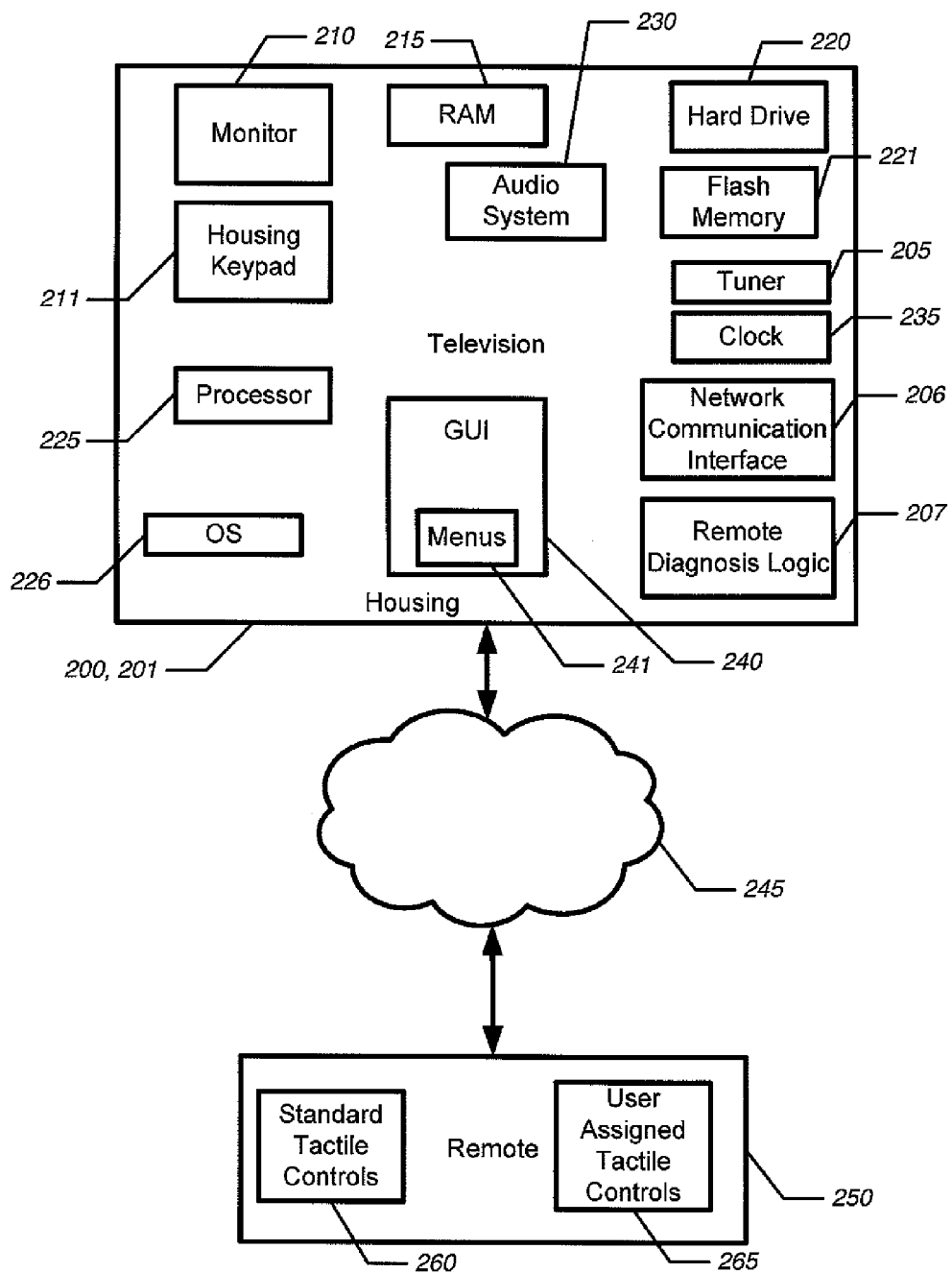
FIG. 2 is a schematic drawing of an apparatus embodiment within the scope of the invention.

FIG. 2 is a schematic drawing illustrating one particular embodiment of an apparatus system of the invention. Other embodiments may have some or all of the components shown in the figure, or may have additional components that are not shown. The system includes a TV 200, a remote 250, and a communication system 245 for communication (usually wirelessly by IR and/or RF technology) between the TV 200 and the remote 250. The components of the TV 200 are contained in a single housing 201. The TV 200 may include an audio system 230, a screen 210 (or panel 210 or monitor 210) for displaying programming, menus 241, and other information. A screen 210 implemented using LCD technology is typically backlit by a bulb that consumes significant power, typically 60 watts or more. A graphical user interface (GUI) 240 facilitates user interfacing with the system, typically through a system of menus 241. The user interface may also include tactile controls within a keypad 211 on the housing 201 and in the remote 250. This housing keypad 211 is limited in functionality compared to a full featured alphanumeric keyboard, and may include, for example, tactile controls (buttons, dials, knobs, etc.) for powering the system on, for setting brightness and contrast, for setting picture size, and/or for entering and navigating a menu system.

Operation of the TV 200 in PO-Mode 500 is controlled by a processor 225, running under an operating system (OS) 226. (Note that the processor 225 might or might not be executing when the system is in a mode 100 other than PO-Mode 500.) Among other things, the processor 225 executes software instructions 310 that manage the user interface. The processor 225 facilitates any power modes 100, including user, default, and system configuration of those modes 100, and transitions between them. In particular, the processor 225 may cause execution, using hardware and/or software instructions 310, of the type of logic described in the embodiments of the processes illustrated by FIG. 6-9.

The TV 200 has tangible electronic storage, which may include RAM 215, flash memory 221, a hard drive 220, or other types of storage. The processor 225 controls input, storage, and retrieval of information using the storage. In conjunction with other hardware components, the processor 225 may facilitate transitions from PO-Mode 500 to other power modes 100 of the TV 200, and, through the menu 241 system of the GUI 240, any user selections regarding power modes 100. RAM 215 is fast storage, typically used by the processor 225 to hold software instructions 310 and data, but its contents are lost when power to the system is off. For an aspect of system state from a previous time to be recoverable by the system to transition to PO-Mode 500 from a sleep mode 590 or U-Mode 530, it must be saved, possibly during PO-Mode 500, to more persistent storage, preferably flash 221 but possibly in some power modes 100 a hard drive 220 or other storage.

The TV 200 may have a network communication interface 206, including components and logic to allow the TV 200 to interface with a wide-area network, such as the Internet. The TV 200 may have remote diagnosis logic 207 that allows a remotely-located technician, through the network communication interface 206, to access parameters and properties of the system, to monitor the system, to make resulting recommendations to a user, and/or to make modifications and repairs to the system.

The remote 250 allows the user to interact with the TV 200, and in particular with its menu 241 system. Other devices (e.g., a computer in communication with the TV 200, or a wireless keyboard) might also be used for such interaction, i.e., as part of the user interface. These devices provide the user with some control over the power modes 100 of the TV 200. For example, through the user interface, the user may be able to specify which factory-configured power mode 100 to use under certain circumstances. The user interface may allow a user to custom configure or define power modes 100 and transition events 140. Some power modes 100 and transition events 140 may be built-in by the factory, for example, to comply with government regulations or other standards. The remote 250 may include tactile controls to enter particular sleep modes 590, including factory-configured standard tactile controls 260 and/or user assigned tactile controls 265. A TV 200 may also have keypad controls 211 in the housing 201, which may also permit some user control over such features.

Figure 3:
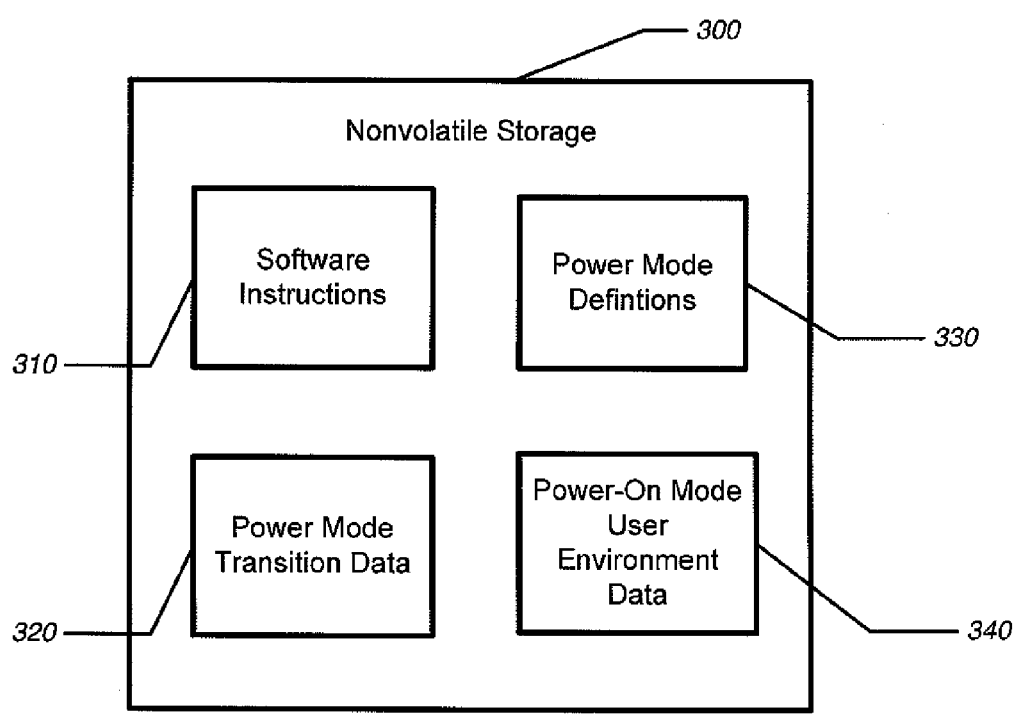
FIG. 3 is a schematic drawing illustrating possible contents of nonvolatile storage on a TV.

FIG. 3 illustrates some types of information that may be kept in nonvolatile storage 300. As mentioned previously, software instructions 310 are executed by the processor 225 to operate the TV 200. Information, as depicted in FIG. 1, may also be held in nonvolatile storage 300, including power mode definitions 320 and power mode transition data 330. Examples of transition events 140 are found in FIGS. 6, 8, and 9. When the system is in a PO-Mode 500, PO Mode User Environment Data 340 is saved to nonvolatile storage 300 to allow the system to be substantially restored to the PO-Mode 500 state. For example, a system may store a current broadcast channel, picture size and format, input source (e.g., tuner or HDMI cable), or Wi-Fi settings. How this information is divided between slow storage (e.g., rotational medium hard disk 220) and fast storage (e.g., flash 221) in a given sleep mode 590 will affect how fast the system can be restored to PO-Mode 500.

Figure 4:
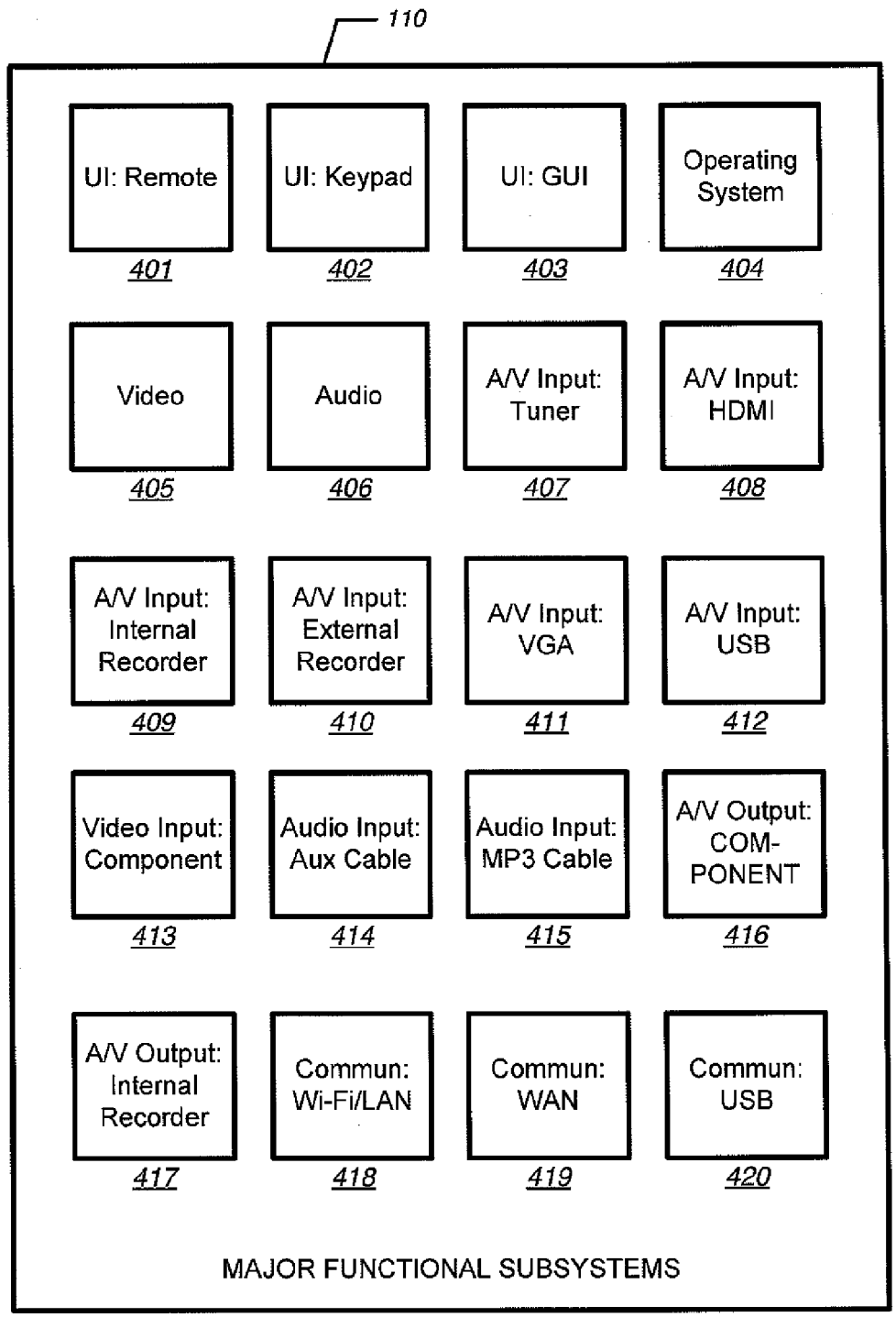
FIG. 4 is a schematic drawing providing examples of possible major functional subsystems of a TV.

FIG. 4 illustrates some of major functional subsystems 110 that, depending on the current power mode 100, might be executing in a TV 200. These subsystems include a remote control subsystem 401, keypad subsystem 402, GUI subsystem 403, operating system subsystem 404, video subsystem 405, audio subsystem 406, tuner input subsystem 407, HDMI input subsystem 408, internal recorder input subsystem 409, external recorder input subsystem 410, VGA video input subsystem 411, USB video input subsystem 412, component video input subsystem 413, AUX input subsystem 414, MP3 input subsystem 415, component output subsystem 416, internal recorder output subsystem 417, Wi-Fi/LAN communication subsystem 418, WAN communication subsystem 419, and Personal Area Network (PAN) communication subsystem 420 (e.g., BLUETOOTH®).

The major functional subsystems 110 are all subsystems at a level of aggregation so that an ordinary user or consumer would be aware that the major functional subsystem 110 is not functioning. Such a user would be aware that the screen 210 was not displaying any video, but would not be aware that a particular transistor was not turned on. Thus, the video subsystem is a major functional subsystem 110, while a component like a transistor would not be. Note that which are subsystems are regarded as major functional subsystems 110 may differ somewhat among users or among persons of ordinary skill in the art.

The list of major functional subsystems 110 in FIG. 4 is not meant to be either necessary or exclusive. A given TV 200 might not have all the major functional subsystems 110 listed in the figure, while another TV 200 might have a major functional subsystem 110 that is not enumerated, both TVs 200 being within the scope of the invention. Note that some of the listed systems might be coupled in the sense that two or more of them may always be either user-enabled 111 or user-disabled 112 together, possibly because they share hardware components.

All TVs 200 within the scope of the invention, however, do have at least a video subsystem 405, a tuner input subsystem 407, an operating system subsystem 404, and tactile controls—a remote control subsystem 401 and/or housing keypad subsystem 402. The video subsystem 405 is user-enabled 111 when normal video information (e.g., a TV show, a recorded movie, or menus) is being displayed on the screen 210. The remote control subsystem 401 system is user-enabled 111 when at least one tactile control on the remote 250 causes a response from the TV 200; and similarly, for the keypad subsystem 402. The remote control subsystem 401 includes the means by which the remote 250 communicates with the TV 200, which might be wired or wireless (e.g., by infrared communication). The operating system subsystem 404 is executing when the OS 226 is booted up and the processor 225 is executing under control of the OS 226 to manage the operation of the TV 200. Because of the complexity of a modern TV 200, booting the OS 226 might be slow, taking as long as a minute. The process of booting the OS 226 may be configured to cause at least one major functional subsystem 110, and possibly essentially all the major functional subsystems 110, to switch from being user-disabled 112 to user-enabled 111. Consequently, the TV 200 can be expected to use more power when the OS 226 has been booted up.

Figure 5:
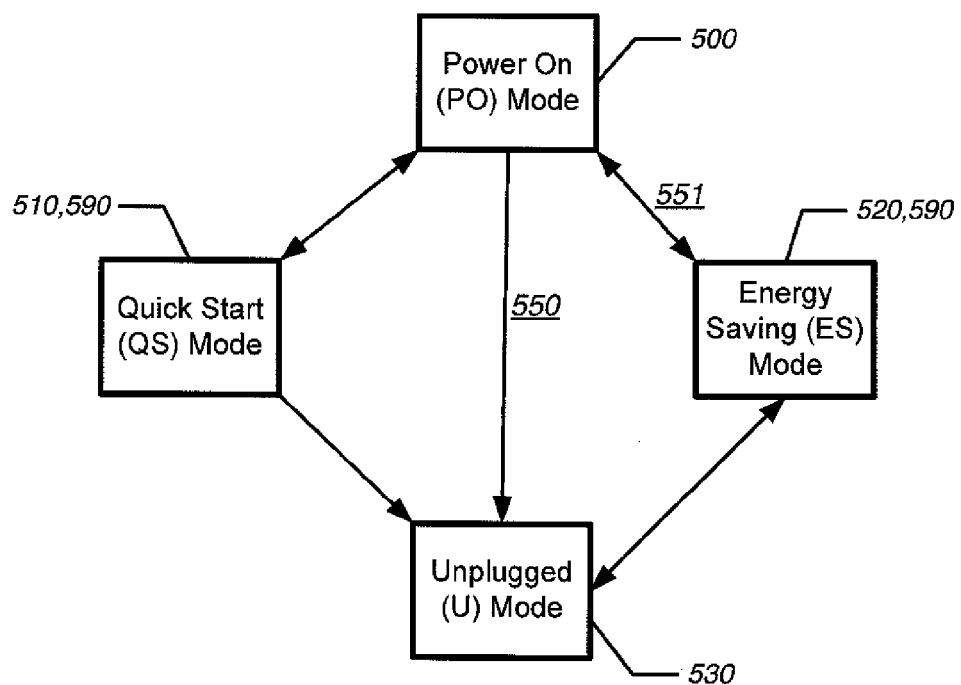
FIG. 5 is a schematic drawing illustrating the power modes and transitions between them implemented in an embodiment of the invention.

As illustrated by FIG. 5, a TV 200 might have a power-on (PO) Mode 500, an energy-saving (ES) mode 520, a quick-start (QS) mode 510, and an unplugged (U) mode 530. The TV 200 and/or remote 250 may have a visible indicator or indicators, such as LEDs, so that a user can determine the current power mode 100. Arrows in the figure (typified by single-headed arrow 550 and double-headed arrow 551) depict one possible scheme of permissible transitions between these modes. For example, direct transition from ES-Mode 520 to PO-Mode 500 is implemented by this particular type of TV 200, but direct transition from U-Mode 530 to PO-Mode 500 is not. In all modes 100 except U-Mode 530, energy is typically supplied by a source external to the TV 200, for example, a building power receptacle, a battery device such as a surge protector, or a power outlet in a motor vehicle. An internal battery may power a system clock 235 or other components.

In PO-Mode 500, the TV 200 is operational. In particular, the system responds to commands from tactile controls, such as from the remote control subsystem 401 or the keypad subsystem 402; the operating system subsystem 404 is executing (and hence user-enabled 111); at least one other major functional subsystem 110 may be user-enabled 111; and the TV 200 is displaying video information on the screen 210. In other words, as a minimum, these three major functional subsystems 110 (tactile control, operating system, and video) may be executing. Some or all of the remaining major functional subsystems 110 are user-enabled 111.

While the system is in PO-Mode 500, current values of some elements of the user environment 130 may be stored in flash 221 or other storage (e.g., solid state disk (SSD)) that is significantly faster than conventional rotational media disk, as they evolve over time, in order to preserve them in case the system transitions to another mode 100. The specific current state elements that are saved to fast storage are chosen so that the TV 200 can return to a state that approximates the most recent previous PO-Mode 500 state as closely as possible. For example, the TV 200 might return to a current tuner 205 channel that was being displayed on the screen 210. The TV 200 might have been playing recorded audio and/or video; playback might resume from the point when PO-Mode 500 was exited.

Unplugging the TV 200 while in any of the other modes may cause the TV 200 to enter U-Mode 530. In U-Mode 530, the TV 200 is unplugged from the external power source. Some aspects of user environment 130 may be retained in flash 221 or other nonvolatile storage 300. Optionally, the TV 200 may be using an internal battery to maintain a system clock 235 or power other components. In U-Mode 530, the tactile control subsystems, the operating system subsystem 404, and the video subsystem 405 are disabled. Plugging the TV 200 into the external power source will cause the TV 200 to transition to one of its other power modes 100. For example, in FIG. 5, the TV 200 transitions to ES-Mode 520 automatically upon the transition event 140 of being plugged into external power. Transition to any other mode 100 is also possible in a given embodiment.

In a sleep mode 590 that is intermediate between PO-Mode 500 and U-Mode 530, any combination of major functional subsystems 110 that are user-enabled 111 and user-disabled 112 components is possible. The sleep mode 590 may have user environment 130 data stored and available to wholly or partially return the system to PO-Mode 500. A trigger, such as the press of a button on the remote 250, may cause the system to return to PO-Mode 500. A sleep mode 590 may be configured to comply with an energy consumption law or standard, such as the ENERGY STAR compliance maximum of one watt for standby. The choices of storage medium and which components are user-enabled 111 and which are user-disabled 112 to achieve an energy usage goal will affect the how long the system takes to restore itself to PO-Mode 500.

ES-Mode 520 and QS-Mode 510 are exemplary sleep modes 590. Flowcharts of transitions between all the modes 100 depicted by FIG. 5, consistent with the transition arrows in FIG. 5, are provided in FIG. 6-8.

In ES-Mode 520, the operating system subsystem 404 and the video subsystem 405 are user-disabled 112, but the remote control subsystem 401 (including the handheld remote control device itself, wireless communication with the TV 200, and components in the TV 200 that respond to user interaction with the device) is user-enabled 111. The remote 250 will include a tactile control such that interaction by the user with that control is a trigger that causes the transition event 140 whereby TV 200 returns to PO-Mode 500. The stored user environment 130 is used to reestablish the previous power-on state as nearly as possible. In some embodiments of ES-Mode 520, all major functional subsystems 110 except the remote control subsystem 401 are user-disabled 112. Because of the limited functionality of the system in ES-Mode 520, power consumption will be low, and may be less than (or less than or equal to) one watt.

In QS-Mode 510, the operating system subsystem 404 and the remote control subsystem 401 are both user-enabled 111, but the video subsystem 405 is user-disabled 112 and the screen 210 may be powered off. Some of the other major functional subsystems 110 may be user-enabled 111, while others may be user-disabled 112. In some embodiments of QS-Mode 510, none of the major functional subsystems 110 of the TV 200 are user-disabled 112 except video subsystem 405. Disabling may mean that the video subsystem 405 is receiving no power, or that power to video subsystem 405 is small compared to when it is user-enabled 111; in any case, the screen 210 appears blank or displays a screen-saver when video subsystem 405 is user-disabled 112. As in ES-Mode 520, interaction of the user with a control on the remote 250 will cause the system to return to PO-Mode 500. The stored user environment 130 is used to reestablish the previous power-on state as nearly as possible.

Because the screen 210 (e.g., a 60 watt backlight in some LCD screens) is such a large consumer of energy, QS-Mode 510 is significantly more efficient than PO-Mode 500. However, ES-Mode 520 is even more efficient. It is possible that ES-Mode 520 may achieve a desired energy efficiency standard, while QS-Mode 510 does not. Because of the time required to boot the OS 226 and other major functional subsystems 110 to PO-Mode 500, restoring from ES-Mode 520 may be very slow, while restoration from QS-Mode 510 to PO-Mode 500 may, depending on which major functional subsystems 110 are user-enabled 111 in QS-Mode 510, be perceived by an ordinary user as instantaneous. As described in subsequent figures, through the user interface, the user can choose between the speed of QS-Mode 510 and the efficiency of ES-Mode 520 as the default behavior of the TV 200 when sleep mode is entered. In some embodiments of the invention, the default is set or reset to ES-Mode 520 whenever the TV 200 gets plugged into external power. In other embodiments, the current default setting survives U-Mode 530 through retention in storage. At least one hardware component (other than the screen 210) may receive power in PO-Mode 500 that does not receive power in QS-Mode 510. At least one hardware component may receive power in QS-Mode 510 that does not receive power in ES-Mode 520.

The TV 200 might or might not have other power modes 100 that are intermediate between with respect how much of the system state is saved and which major functional subsystems 110 are user-enabled 111. Each such power mode 100 is characterized by how rapidly specific items of functionality may be restored to PO-Mode 500, which state data are stored and where, and by the energy usage of that mode 100. For example, the TV 200 might have a hibernate mode, in which the PO Mode User Environment Data 340 is stored on a slower device, such as a rotational media drive. Transition from hibernate mode to PO-Mode 500 requires spinning up the hard drive 220 and transferring aspects of system state data to memory from that relatively slow storage device.

The TV 200 facilitates transition based on the transition events 140 associated with each mode 100. In some cases, these transition events 140 might occur automatically, and in others they may require manual input from a user. For example, the TV 200 may facilitate transition from PO-Mode 500 to a fast-boot sleep mode 590 (e.g., QS-Mode 510) upon the occurrence of a first type of event. The TV 200 may facilitate transition from the fast-boot sleep mode 590 to another sleep mode 590 (or an essentially fully powered-down state, similar to U-Mode 530) upon the occurrence of a second type of event. If the TV 200 has another intermediate mode, such as ES-Mode 520, then there may be three types of transition events 140 causing the system to successively move down through the power modes 100, from most to least energy usage.

What are these types of events? A triggering event might be specified by a user request, such as a press of a remote button labeled "Power" (or, for example, "Sleep" or "Standby"). With a computer, lack of tactile interaction of the user with the system (e.g., keyboard strokes or mouse movements) usually indicates that the user has walked away from the system, but lack of tactile interaction with a TV 200 may indicate rapt user attention. A transition event 140 might be triggered by duration in a power mode 100; for example, after the TV 200 has been in a sleep mode 590 for 1 hour without tactile user interaction, then the system shifts to a hibernate mode. A transition event 140 might be triggered by consumption of a specified amount of energy; for example, when the system has burned 5 Joules in sleep mode 590, then the TV 200 changes to a power off mode, with minimal functionality. A transition event 140 might be triggered by a rate of energy consumption. For example, if consumption of energy in sleep mode 590 is exceeding 0.5 watts, then switch to a slower-boot power mode 100. Note that the rate of energy consumption in the system in a sleep mode 590 may be a fixed property of the system, so that this type of event might mean that the system never spends more than a moment in that mode 100. Other types of triggers are also possible within the scope of the invention, and the invention is not limited to the types specified above—for example, if the temperature of an electrical component exceeds a certain value a transition event 140 might occur. Also, a transition event 140 might be triggered upon truth of some boolean expression combining any of the above events, such as if a time interval is exceeded or a temperature consumption is exceeded.

How might such triggers be specified? Some triggers might be user specified, and others might be fixed properties of the system. For example, by law in some jurisdiction, the amount of energy expended in sleep mode 590 might be limited to a fixed value. In this case, a TV 200 might have the appropriate automated transition set at the factory, without user access. Other transition events 140 might be capable of being specified by a user through the menu 241 system, which is accessible by the remote.

How is the functionality (i.e., which major functional subsystems 110 are user-enabled 111) of a power mode 100 defined? Typically, the functionality of each the modes 100 will be a built-in property of the system, However, a TV 200 might give a user control over some or all aspects defining a power mode 100, such as those shown in FIG. 1. in a particular power mode 100. For example, what is saved in a power mode 100 and where it is saved, and what functionality is provided, and which components are user-enabled 111 and user-disabled 112 (in other words, all the elements of FIG. 1), might be wholly or partially specifiable by a user. This might be done by menus 241 that provide the user with appropriate choices. For a given set of power mode 100 configuration choices, such a TV 200 might also provide the user with a description comparing the available modes 100, or even detailed estimates of how the TV 200 can be expected to behave with a particular power mode 100 configuration. A user who is particularly interested in either saving money or in protecting the environment might choose power modes 100 that are more sluggish than, say, a person who is required to watch TV 200 as part of a business.

Figure 6:
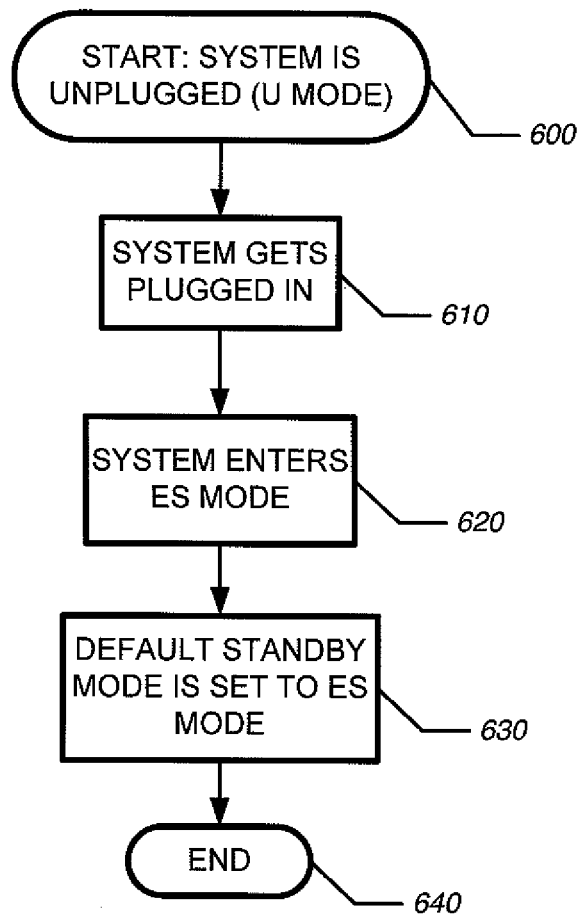
FIG. 6 is a flowchart of an embodiment of a process within the scope of the invention, illustrating a TV being plugged into external power.
Figure 7:
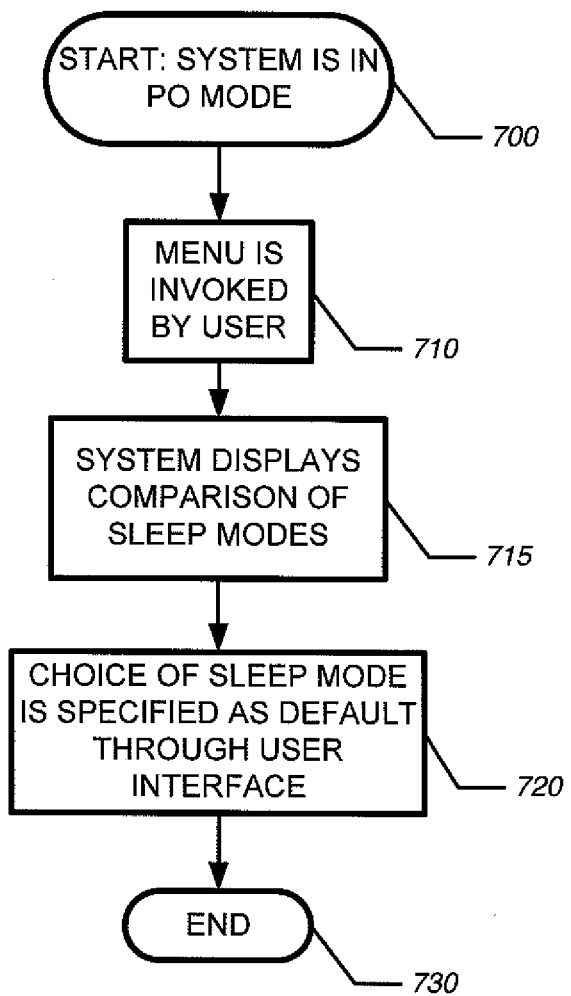
FIG. 7 is a flowchart of an embodiment of a process within the scope of the invention, illustrating a default standby mode being selected through a user interface.
Figure 8:
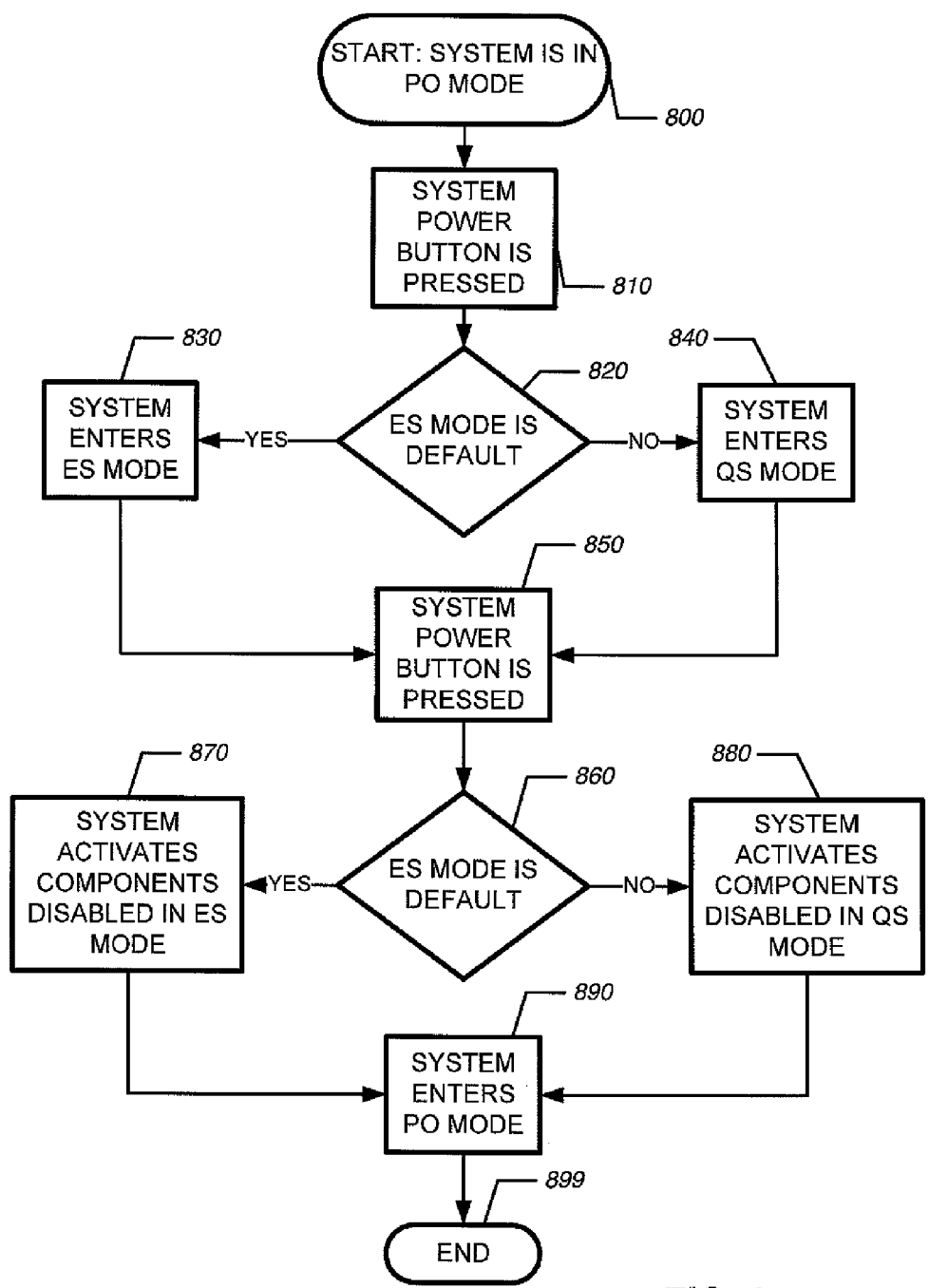
FIG. 8 is flowchart of an embodiment of a process within the scope of the invention, illustrating transition from power-on mode into a current default sleep mode and back to power-on mode.

FIG. 6-8 are a set of related flowcharts that illustrate embodiments of the invention in which transitions occur upon manual transition events 140. These figures represent embodiments that are consistent with the set of modes 100 and transition events 140 of FIG. 5.

At the start 600 of FIG. 6, the TV 200 is unplugged from the external power source. After the system gets plugged in 610, it enters 620 into ES-Mode 520, which may be defined as described previously. In this embodiment, the system has a default sleep mode 590, which is automatically set 630 to ES-Mode 520 whenever the TV 200 gets plugged into the external power source. The process ends 640. In alternative embodiments, a previous default, which could be system- or user-specified, such as QS-Mode 510, might be automatically entered upon plug in.

In FIG. 7, the TV 200 is initially 700 in PO-Mode 500. Using the remote 250 or keypad controls 211, a menu 241 in the GUI 240 is invoked 710. Optionally, the menu 241 may display 725 relative pros and cons of ES-Mode 520 or QS-Mode 510 for the user. The menu 241 allows the user to select the default sleep mode, either ES-Mode 520 or QS-Mode 510. The process ends 730.

FIG. 8 also starts 800 with the TV 200 in PO-Mode 500. A tactile control on the remote 250 or housing 201 is engaged by the user; for example, the user might press 810 a system power button on the remote 250. If 820 the default sleep mode 590 is ES-Mode 520, then the system enters 830 into ES-Mode 520. Otherwise, the system enters 840 into QS-Mode 510. Now the system power button (or other appropriate tactile control) is again pressed or otherwise engaged 850. If 860 the default sleep mode 590 is ES-Mode 520, then the system activates 870 those components that are user-disabled 112 in ES-Mode 520. Otherwise, the system activates 880 those components that are user-disabled 112 in QS-Mode 510. In either case, the TV 200 then enters 890 into PO-Mode 500 and the process ends 899.

Figure 9:
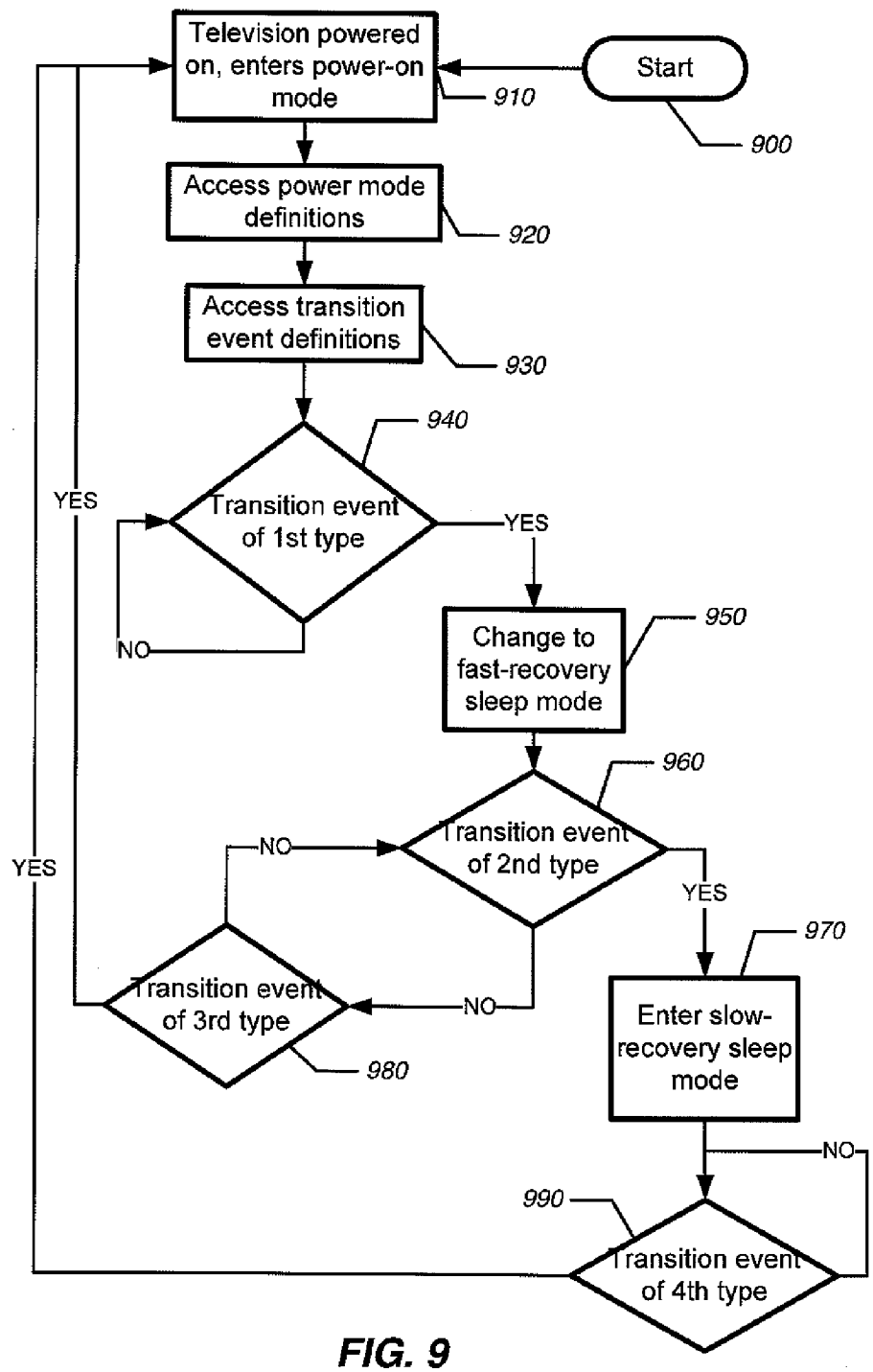
FIG. 9 is a flowchart of an embodiment of a process within the scope of the invention, illustrating automated transitions between modes.

FIG. 9 is a flowchart illustrating an embodiment of a process within the scope of the invention. The process starts 900 when the TV 200 enters PO-Mode 500, either by user command through a tactile control, or by an automated transition. When the TV 200 is powered on, it may access 920 the definitions of the power modes 100 as illustrated by FIG. 5. For each power mode 100, the respective functionality of the system is specified, such as which components are powered up (or user-enabled 111) and where user environment 130 data is stored or maintained. The reader will realize that this information might be obtained at other times during the process, within the scope of the invention. Similarly (and with the same caveat), triggers for the transition events 140 are accessed 930. As described above, these events might depend upon time considerations, total energy usage, energy usage rates, or any other appropriate factors. At this point, the system, under control of the processor 225, watches 940 for an occurrence of a first type. Here, for sake of illustration, if such a transition event 140 occurs, then the system enters 950 a first sleep mode 590 (e.g., QS-Mode 510), as previously described. In the first sleep mode 590, system state is stored in fast nonvolatile storage 300 (e.g., flash 221), and many of the major functional subsystems 110 may be user-enabled 111, thereby making this sleep mode 590 a fast-recovery one. While in the first sleep mode 590, the system watches 960 for defined transition events of a second type, causing the system to enter a second sleep mode 590, one that has slower recovery because of major functional subsystems 110 that are user-disabled 112 and/or because of slower-access nonvolatile storage used to save user-enabled 111 data. Of course, transitions to other modes 100, with mode 100 specifications and transition events 140 appropriately defined, are possible; for example, the system might more sleep modes 590 (e.g., ES-Mode 520), from which return to PO-Mode 500 is relatively slow compared to the first and second sleep modes 590. While in the first sleep mode 590, if the system observes 980 of a third type, then the system returns to PO-Mode 500. While in the second sleep mode 590, if the system observes 990 of a fourth type, then the system returns to PO-Mode 500. While the details may differ, any sequence of transition events 140 that causes the system to automatically or manually move down a sequence of successively more efficient and slower to reestablish PO-Mode 500, is within the scope of the invention.

Of course, many variations of the above method are possible within the scope of the invention. The present invention is, therefore, not limited to all the above details, as modifications and variations may be made without departing from the intent or scope of the invention. Consequently, the invention should be limited only by the following claims and equivalent constructions.

What is claimed is:

1. A system, comprising:
   a) a television, including
      (i) a housing containing a screen, an integrated tuner, at least one processor, and a keypad;
      (ii) the at least one processor, which manages transitions between modes of the television, and when the system is in a power-on mode wherein the screen is powered on, executes logic to manage functionality of the television from within a booted-up operating system,
      (iii) an energy-saving mode in which the screen is powered off but at least one component of the television receives power, and from which, in order for the system to transition to the power-on mode, the operating system must be booted up, and
      (iv) a quick-start mode, in which the screen is powered off and the operating system is booted up; and
   b) a remote control device.

2. The system of claim 1, wherein a component of the television receives power when the system is in the quick-start mode but does not receive power when the system is in the energy-saving mode.

3. The system of claim 1, wherein a major functional subsystem of the television is enabled when the system is in the quick-start mode but is disabled when the system is in the energy-saving mode.

4. The system of claim 1, wherein sufficient components are powered off when the television is in the energy-saving mode so that the television uses no more than one watt of power in the energy-saving mode.

5. The system of claim 1, wherein sufficient components are powered on when the television is in the quick-start mode so that the television requires no more than 10 seconds to transition to the power-on mode.

6. The system of claim 1, wherein, when the system is in power-on mode, the television has a default sleep mode, that is either the energy-saving mode or the quick-start mode, and wherein when a user request to enter a sleep mode is received through a first tactile control of a user interface in the system, the system enters the default sleep mode.

7. The system of claim 6, wherein the user request to enter the sleep mode is received through a second tactile control, not necessarily distinct from the first tactile control, on the keypad or the remote control device.

8. The system of claim 6, wherein the default sleep mode is initially set at the factory to be the energy-saving mode.

9. The system of claim 6, wherein the default sleep mode can be set or changed by receipt of a request through the user interface.

10. The system of claim 9, wherein the system displays on the screen a comparison of functionality of the television when the television is in the quick-start mode and the energy-saving mode, respectively, before setting or changing the default sleep mode.

11. The system of claim 6, wherein when the television gets plugged into an external power source, the default sleep mode is set to the energy-saving mode.

12. The system of claim 6, wherein when the television gets plugged into an external power source, the default sleep mode is set to a selection that is read from tangible storage.

13. A method, comprising:
   a) entering a power-on mode by a television having a screen and a built-in tuner, wherein an operating system of the television is booted up in the power-on mode, and wherein the television has a housing that contains processing logic implementing
      (i) an energy-saving mode, wherein the operating system is not booted up, a first set of components of the television are powered off, and a second set of components of the television are powered on, and
      (ii) a quick-start mode, wherein the operating system is booted up and a component of the television that is not in the second set of components is powered on, and a component of the television, which is powered on in the power-on mode, is powered off; and
   b) accessing a choice of a default sleep mode that is either the energy-saving mode or the quick start mode;
   c) receiving a request through a user interface on the television to transition to the default sleep mode; and
   d) transitioning to the default sleep mode from the power-on mode in response to the request.

14. The method of claim 13, further comprising:
   e) receiving through a user interface the choice of the default sleep mode; and
   f) saving the choice of the default sleep mode to tangible storage in the television.

15. The method of claim 13, further comprising:
   e) unplugging the television from a first external power source;
   f) plugging the television into a second external power source, not necessarily distinct from the first external power source; and
   g) after the step of plugging, setting the default sleep mode to be the energy-saving mode.

16. The method of claim 15, further comprising:
   h) after the step of plugging, entering the energy-saving mode.

17. A television, comprising:
   a) a housing that includes a screen;
   b) physical memory or storage, in the housing, containing
      (i) first, second, and third transition definitions, respectively specifying triggers for first, second, and third transition events,
      (ii) sleep mode definitions, defining respective functionality of the television in a first sleep mode and a second sleep mode; and
   c) management logic, executed by at least one processor in the housing, that
      (i) when a trigger for a first transition event occurs, changes the functionality of the television from a power-on mode to the first sleep mode, (ii) when a trigger for a second transition event occurs, changes the functionality of the television from the first sleep mode to the second sleep mode, and (iii) when a trigger for a third transition event occurs, changes the functionality of the television from the first sleep mode or the second sleep mode to the power-on mode.

18. A system, comprising:

a) a television, including (i) a housing containing a video system, an integrated tuner, at least one processor, and a keypad;

(ii) the at least one processor, which manages transitions between modes of the television, and when the system is in a power-on mode wherein the video system is user-enabled, executes logic to manage functionality of the television from within a booted-up operating system, (iii) an energy-saving mode in which the video system is user-disabled but at least one component of the television receives power, and from which, in order for the system to transition to the power-on mode, the operating system must be booted up, and (iv) a quick-start mode, in which the screen is user-disabled and the operating system is booted up; and b) a remote control device.

* * * * *